Nov. 21, 1950 F. E. PONTIUS 2,530,584

MULTIPLE MAGNETIC HEAD MOUNT

Filed Dec. 29, 1948

INVENTOR,
FRANK E. PONTIUS
BY Orl R. Goshaw
ATTORNEY

Patented Nov. 21, 1950

2,530,584

UNITED STATES PATENT OFFICE 2,530,584

MULTIPLE MAGNETIC HEAD MOUNT

Frank E. Pontius, Los Angeles, Calif., assignor to Radio Corporation of America, a corporation of Delaware Application December 29, 1948, Serial No. 67,891

6 Claims. (Cl. 179—100.2)

This invention relates to magnetic recording, and particularly to a mounting structure for a plurality of magnetic heads used for recording, reproducing, and erasing.

In the art of magnetic sound recording and reproduction, it is well-known that, although the heads used for recording, reproducing, and erasing may have the same general type of construction, they should, to obtain optimum results, be different to the extent of having gaps of different widths. To produce these results, it is desirable that a separate head be provided to perform each function, thus requiring three separate heads. It is also desirable that these heads be located as near one another as possible.

The present invention, therefore, is directed to a mount for a plurality of heads, such as two or three, each of which is separately adjustable in the mount to orient the gaps thereof, the gaps having their long dimensions perpendicular to the direction of motion of the magnetic record medium passing thereover. The mount also provides for a common adjustment for track alignment or placement. That is, the heads are arranged in serial order with the gap in each head properly oriented, and then all heads may be simultaneously moved transversely across the record medium. The heads are arranged in a curved path so that each gap makes the proper contact with the record medium. The construction is unitary, simple, and economical to manufacture, and permits the several adjustments to be easily made.

The principal object of the invention, therefore, is to facilitate the recording, reproducing, and erasing of magnetic sound records.

Another object of the invention is to provide an improved magnetic head and mounting structure.

A further object of the invention is to provide a unitary mounting structure for a plurality of serially arranged magnetic heads.

A still further object of the invention is to provide an improved multiple head mounting structure which permits the individual adjustment of each head and the simultaneous adjustment of all heads.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
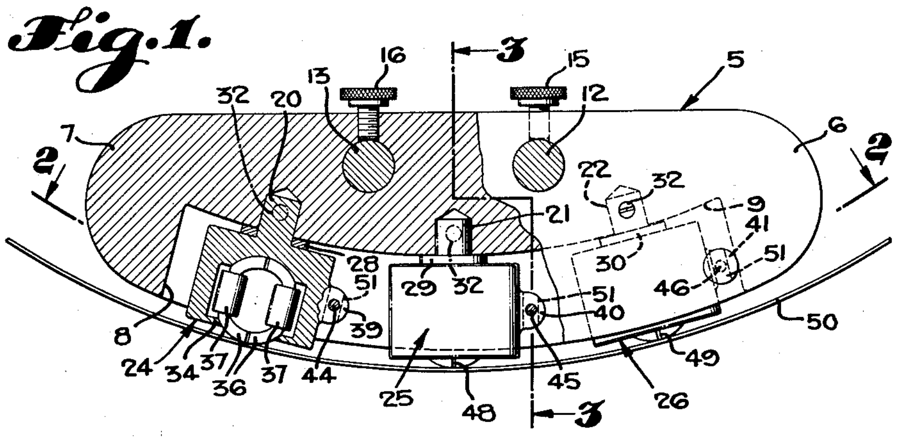
Fig. 1 is a plan view, partly in cross-section, of a magnetic head mount embodying the invention.

Referring now to the drawings, in which the same numerals identify like elements, a rectangular casting 5, having end sections 6 and 7, has a rectangular, arcuate groove or recess 8 with a curved bottom surface 9 milled therein. Two holes are provided through the upper section of the casting 5, which permits the casting to be mounted on a pair of rods 12 and 13 and slidable therealong, the casting being held fixed in a predetermined position by a pair of thumb set screws 15 and 16.

Holes are drilled into the surface 9 of the recess into which the cylindrical ends or shafts 20, 21, and 22, of respective magnetic head holders 24, 25, and 26 are press fitted, respective washers 28, 29, and 30 being provided between the shoulders of the holders and the surface 9 of the recess 8. Thus, the holders 24, 25, and 26 are rotatable on the ends of shafts 20, 21, and 22, and, when once adjusted to their proper positions, may be held therein by set screws, such as shown at 32. The holders 24, 25, and 26 may be made of any suitable non-magnetic material, these holders having a rim, such as shown at 34, which may be crimped over to hold the cores, such as shown at 36, and windings, such as shown at 37, of the respective heads in position.

Figure 2:
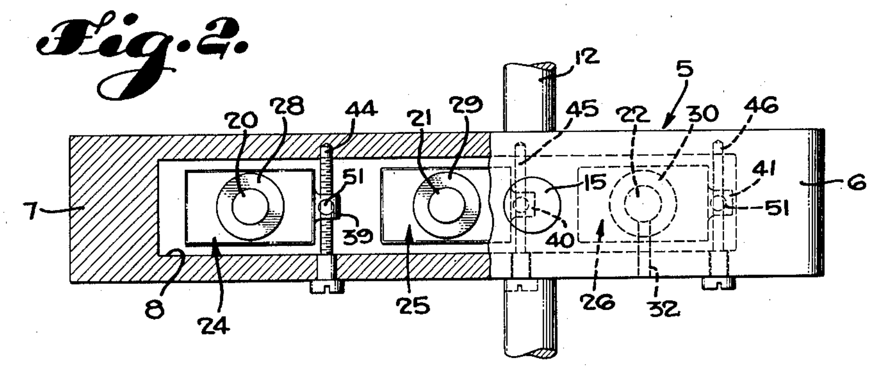
Fig. 2 is an elevational view of the mount shown in Fig. 1, and taken along the line 2—2 of Fig. 1.
Figure 3:
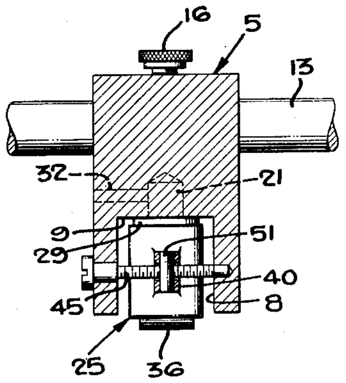
Fig. 3 is a detailed view of the adjusting structure for orienting the gap of each individual head, and taken along the line 3—3 of Fig. 1.

The holders 24, 25, and 26 each have a drilled boss thereon, as shown at 39, 40, and 41, these bosses having cylinders pressed therein, such as shown at 51, which cylinders are internally threaded at right angles to the axes thereof to accommodate a plurality of screws 44, 45, and 46 threaded therein, the screws having their ends rotatable in holes in the walls of the recess 8 in the casting 5 (see Fig. 2). Thus, when the set screws, such as shown at 32, are loosened, and any of the screws 44, 45, or 46 turned, rotation of the holders 24, 25, and 26 is accomplished on shafts 20, 21, and 22, which consequently orients the gaps, such as shown at 48 and 49, with respect to the direction of motion of a magnetic record medium 50 passing thereover. During these adjustments, cylinders 51 rotate in the bosses. To properly place a magnetic track transversely of the film or tape 50, the screws 15 and 16 are loosened and the casting 5 adjusted on rods 12 and 13.

With the above construction, therefore, a very compact and unitary mount for a plurality of serially arranged magnetic heads is provided, and one which permits the individual orientation of the respective gap of each head and the simultaneous adjustment of all heads to obtain the proper track placement on the magnetic recording medium.

I claim:

1. An adjustable mounting for a plurality of magnetic heads, comprising a casting having a rectangular recess therein, said recess having side walls and a bottom surface and extending along the major portion of the length of said casting, a plurality of magnetic head holders having stub shafts thereon, said stub shafts being positioned in a series of openings along the major portion of the length of and in the surface of said recess, individual means connecting said holders and the walls of said recess for pivoting sail holders on their respective shafts, and means for simultaneously adjusting all of said heads in at least one direction.

2. An adjustable mounting for a plurality of magnetic heads in accordance with claim 1, in which said means for pivoting said holders on their respective shafts includes cylinders in said holders and rotatable stationary screws through said cylinders for pivoting said heads upon rotation of said screws, and said last mentioned means includes a plurality of rods within transverse openings in said casting, said casting being slidable on said rods.

3. A multiple magnetic head mount for positioning said heads in an arcuate path, comprising an elongated casting having a rectangular recess therein said recess having side walls and a bottom surface and extending along the major portion of the length of said casting, said bottom surface being curved, a plurality of magnetic head holders having stub shafts fitted in the openings along the length of and in the bottom surface of said recess, means for individually pivoting each of said holders on said stub shafts to orient the gaps of magnetic heads held by said holders with respect to the motion of a record medium over said gaps, means for fixedly maintaining said holders in an adjusted position, and means for simultaneously adjusting all of said holders transversely with respect to said record medium passing over said gaps.

4. A multiple magnetic head mount in accordance with claim 3, in which said gap orienting means comprises screws perpendicular to the axes of said stub shafts and mounted in the walls of said recess and passing through cylinders in said head holders.

5. A multiple magnetic head holder, comprising a rectangular casting having an elongated recess therein disposed along the length of said casting, said recess having parallel side walls and an arcuate bottom surface, a plurality of magnetic head holders having stub shafts positioned in holes in said casting and disposed along said arcuate surface and having their axes normal to said surface, an extension from each of said holders, rotatable cylinders in said extensions, a screw passing through each of said cylinders, the ends of said screws being positioned in the walls of said recess, rotation of each of said screws moving said cylinders and pivoting a respective holder on its shaft, and means for simultaneously moving all of said holders.

6. A multiple hagnetic head holder in accordance with claim 5, in which said last mentioned means includes a pair of rods passing through holes in said casting perpendicular to the axes of said shafts, said casting being slidable on said rods.

FRANK E. PONTIUS.

No references cited.